(12) United States Patent
Asahara

(10) Patent No.: US 8,351,821 B2
(45) Date of Patent: Jan. 8, 2013

(54) IMAGE FORMING APPARATUS, CONTROL METHOD, AND PROGRAM

(75) Inventor: Hideo Asahara, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/365,499

(22) Filed: Feb. 3, 2012

(65) Prior Publication Data

US 2012/0137312 A1 May 31, 2012

Related U.S. Application Data

(63) Continuation of application No. 12/647,611, filed on Dec. 28, 2009, now Pat. No. 8,139,980.

(30) Foreign Application Priority Data

Jan. 14, 2009 (JP) .................................. 2009-006119

(51) Int. Cl.
*G03G 15/08* (2006.01)

(52) U.S. Cl. ...................................................... 399/120

(58) Field of Classification Search .................. 399/120; 710/63, 72, 100, 104, 8; 719/321, 326, 328
See application file for complete search history.

(56) References Cited

U.S. PATENT DOCUMENTS

| 5,623,696 A | * | 4/1997 | Johnson et al. ............... 719/326 |
| 6,671,749 B2 | * | 12/2003 | Williams et al. ............... 710/10 |
| 7,673,303 B2 | * | 3/2010 | Sadovsky et al. ............. 718/101 |
| 2003/0079050 A1 | * | 4/2003 | Chang et al. .................. 709/321 |
| 2004/0267973 A1 | * | 12/2004 | Sumida et al. .................... 710/8 |
| 2005/0138231 A1 | | 6/2005 | Yamaguchi et al. |
| 2007/0240124 A1 | | 10/2007 | Taneda et al. |

FOREIGN PATENT DOCUMENTS

| JP | 10-27149 | 1/1998 |
| JP | 2001-344192 A | 12/2001 |
| JP | 2005-050064 A | 2/2005 |
| JP | 2007-110628 A | 4/2007 |
| JP | 2008-146398 A | 6/2008 |
| JP | 2008-176428 A | 7/2008 |
| WO | 2006059493 A1 | 6/2006 |

OTHER PUBLICATIONS

Japanese Office Action issued on Oct. 26, 2012, concerning Japanese Patent Application No. 2009-006119.

* cited by examiner

*Primary Examiner* — Kiho Kim

(74) *Attorney, Agent, or Firm* — Fitzpatrick, Cella, Harper & Scinto

(57) ABSTRACT

The invention provides a mechanism which allows a common device driver to obtain identification information of a USB device desired by an application that controls a USB device via a common device driver. Furthermore, the invention includes two types of common device drivers to be registered in an OS to have different priorities, and provides a common interface that does not allow the application to recognize their difference.

10 Claims, 10 Drawing Sheets

FIG. 6

| APPLICATION ID | USB DEVICE VENDOR ID | USB DEVICE PRODUCT ID | DEVICE DRIVER IDENTIFIER | TIME STAMP |
|---|---|---|---|---|
| 0001 | 0x04A9 | 0x2680 | COMMON DEVICE DRIVER | 2008/12/31 |
| 0001 | 0x04A9 | 0x2681 | COMMON DEVICE DRIVER | 2008/12/31 |
| 0001 | 0x04A9 | 0x2682 | COMMON DEVICE DRIVER | 2008/12/31 |

| PRIORITY | DRIVER TYPE |
|---|---|
| HIGH | VENDOR SPECIFIC CLASS DRIVER |
| MIDDLE | COMMON DEVICE DRIVER (WITH IDENTIFICATION INFORMATION) |
| LOW | GENERIC STANDARD DEVICE CLASS DRIVER |
| LOWEST | COMMON DEVICE DRIVER (WITHOUT IDENTIFICATION INFORMATION) |

IMAGE FORMING APPARATUS, CONTROL METHOD, AND PROGRAM

This application is a continuation of U.S. application Ser. No. 12/647,611, filed Dec. 28, 2009 (allowed), the contents of which are incorporated by reference herein.

BACKGROUND OF THE INVENTION

1. Field of the Invention

The present invention relates to an image forming apparatus, control method, and program, which control peripherals using applications and, more particularly, to an image forming apparatus in which a plurality of applications control peripherals using a common device driver.

2. Description of the Related Art

A multi-functional peripheral equipment (MFP) has various functions. As one of these functions, a mechanism that allows the user to install favorite applications after he or she purchased the MFP is available. This mechanism is normally used for the purpose of customizing functions of the MFP in correspondence with a user's environment. These applications often use functions of externally connected devices such as USB devices. In this case, some types of device drivers used to control the behaviors of the USB devices are required. The types of device drivers will be described below. However, note that terms to be described below are not widely known.

One type of device driver is a generic standard device class driver. Note that "class" indicates a category grouped depending on functions provided by USB devices. The general-purpose class indicates a class except for a vendor-specific class (to be described later) of those classes. The generic standard device class driver is a device driver, which is used to control the behaviors of a USB device which belongs to the general-purpose class. Due to existence of this generic standard device class driver, vendors who develop USB devices can enhance the developing efficiency of device drivers. By contrast, when each vendor wants to provide a function which is not defined in the compatible general-purpose class, it has to uniquely develop a device driver which provides that function. As a practical example of the generic standard device class driver, an HID class driver, Mass Storage class driver, and the like are available. In general, an OS such as Windows® or Linux provides such generic standard device class driver.

Another type of device driver is a vendor specific class driver. Vendors indicate developers who develop USB devices. A vendor specific class driver is a dedicated device driver, which is uniquely developed by a vendor, so as to control the behavior of a USB device which does not belong to the aforementioned general-purpose class. The vendor specific class driver can freely define behaviors for functions provided by the vendor. However, when the OS version has changed, a device driver has to be created again accordingly.

The final type of device driver is a common device driver. The common device driver is a concept which does not exist in a general OS such as Windows® or Linux, and allows the aforementioned application to freely control the behaviors of USB devices. Unlike the aforementioned vendor specific class driver, not a device driver but the application has a logic of controlling the behaviors of USB devices. Although the performance of the common device driver is inferior to the vendor specific class driver, that driver can have scalability independently of the OS version.

A simple sequence upon selecting an appropriate device driver from these types of device drivers will be described below. Note that selecting a device driver in correspondence with a certain USB device and letting that driver control the USB driver is expressed by "loading a device driver". When a certain USB device is connected to an information apparatus, an OS searches for an appropriate device driver. Each generic standard device class driver and vendor specific class driver register identifiers required to identify USB devices supported by themselves in an OS. Therefore, the OS selects a driver corresponding to the identifier of the connected device, and loads the selected driver. By contrast, since a common device driver cannot specify a device supported by itself, it does not register any information in the OS. Upon detection of connection of a USB device, the OS checks if a compatible device driver is available in the order of vendor specific class drivers and generic standard device class drivers.

Windows® as a representative of a general OS does not incorporate any common device drivers. For this reason, Windows® has a specification for displaying, when a compatible device driver cannot be found from registered generic standard device class drivers or vendor specific class drivers, a wizard dialog for prompting the user to install a new appropriate driver. Likewise, since Linux does not incorporate any common device drivers, no device driver is selected when a compatible device driver cannot be found from registered generic standard device class drivers or vendor specific class drivers.

As an example of a platform that includes common device drivers, an MFP-dedicated application platform which is implemented using Java® is known. In this platform, when a device driver compatible with an installed device cannot be found, a common device driver is loaded.

As a related art about device driver selection, Japanese Patent Laid-Open No. 10-27149 is available. Japanese Patent Laid-Open No. 10-27149 comprises a dispatch device driver which has device driver registration information that describes the relationship between device drivers and device identifiers, and selects a device driver compatible with a device in accordance with this information. According to Japanese Patent Laid-Open No. 10-27149, addition of a new driver and a change of the relationship in the device driver registration information can be made.

In some cases, an application which controls a USB device via the aforementioned common device driver wants to execute special control with respect to a general-purpose class device. For example, a practical example of such case is the following demand. That is, when a given application wants to use, as an authentication device, a magnetic card reader installed as an HID class, it wants to prevent from notifying other applications of the communication contents. As another example, a special encryption area is demanded to be assured in a memory device installed as a Mass Storage class. In order to meet such demands, it is possible to install a new vendor specific class driver. However, installation of the vendor specific class driver has high dependence on the kernel of an OS and poor portability. Since the vendor specific class driver runs in a kernel mode, providing unit that allows replacing the driver possesses the risk of a security level drop upon using an apparatus. For this reason, use of the vendor specific class driver cannot often be a solution in practice.

In order to meet the above demands, it is desirable to select and use a common device driver. However, according to the aforementioned device driver selection logic, when a generic standard device class driver which has a higher priority than a common device driver is registered as a driver compatible with a newly installed device, that driver is preferentially selected and loaded. Hence, an application cannot control that device. As a simple method of solving such problem, a method of preparing a switch that disables generic standard device class drivers may be used. However, when this method is used, other general-purpose class USB devices can no longer be used. Hence, this method is not a desirable solution.

As another solution, common device drivers may be registered as vendor specific class drivers. However, since information of a USB device to be controlled by an application cannot be detected from a common device driver, the common device driver cannot register an identifier required to identify the USB device supported by itself in an OS. Furthermore, in the Linux OS, as its specification, there is a restriction that one device driver cannot be registered in the OS to have two or more different priorities. For this reason, when a common device driver is registered as a vendor specific class driver, registration for selecting a common device driver cannot be made for other USB devices for which no compatible device drivers are registered. As a result, other applications cannot control USB devices.

As described above, a demand has arisen for a mechanism that allows an application, which controls a USB device via a common device driver, to preferentially select a common device driver in consideration of a case in which such application wants to execute special control with respect to a general-purpose class device.

SUMMARY OF THE INVENTION

According to one aspect of the present invention, there is provided an image forming apparatus, which comprises an interface used to control a peripheral by an application which is configured to be installed and uninstalled, and a common device driver which does not depend on the peripheral, the apparatus comprising: a peripheral identification information append unit which adds identification information of the peripheral to be controlled by the application to a first common device driver; and a device identification information registration unit which registers the first common device driver in the interface as a device driver usable by the application together with the identification information added by the peripheral identification information append unit.

According to the present invention, the aforementioned application which controls a USB device via a common device driver is allowed to control a desired USB device by designating the desired USB device in advance. At the same time, when an OS does not include any device driver required by a specific USB device, a common device driver is loaded in a conventional manner, and can be controlled from an application.

Further features of the present invention will become apparent from the following description of exemplary embodiments (with reference to the attached drawings).

BRIEF DESCRIPTION OF THE DRAWINGS

FIG. 6 is a table showing an example of a target device list, so as to explain the first embodiment of the present invention;

FIG. 9 is a table showing priorities upon registration of device drivers in the present invention for the purpose of convenience.

DESCRIPTION OF THE EMBODIMENTS

First Embodiment

Figure 1:
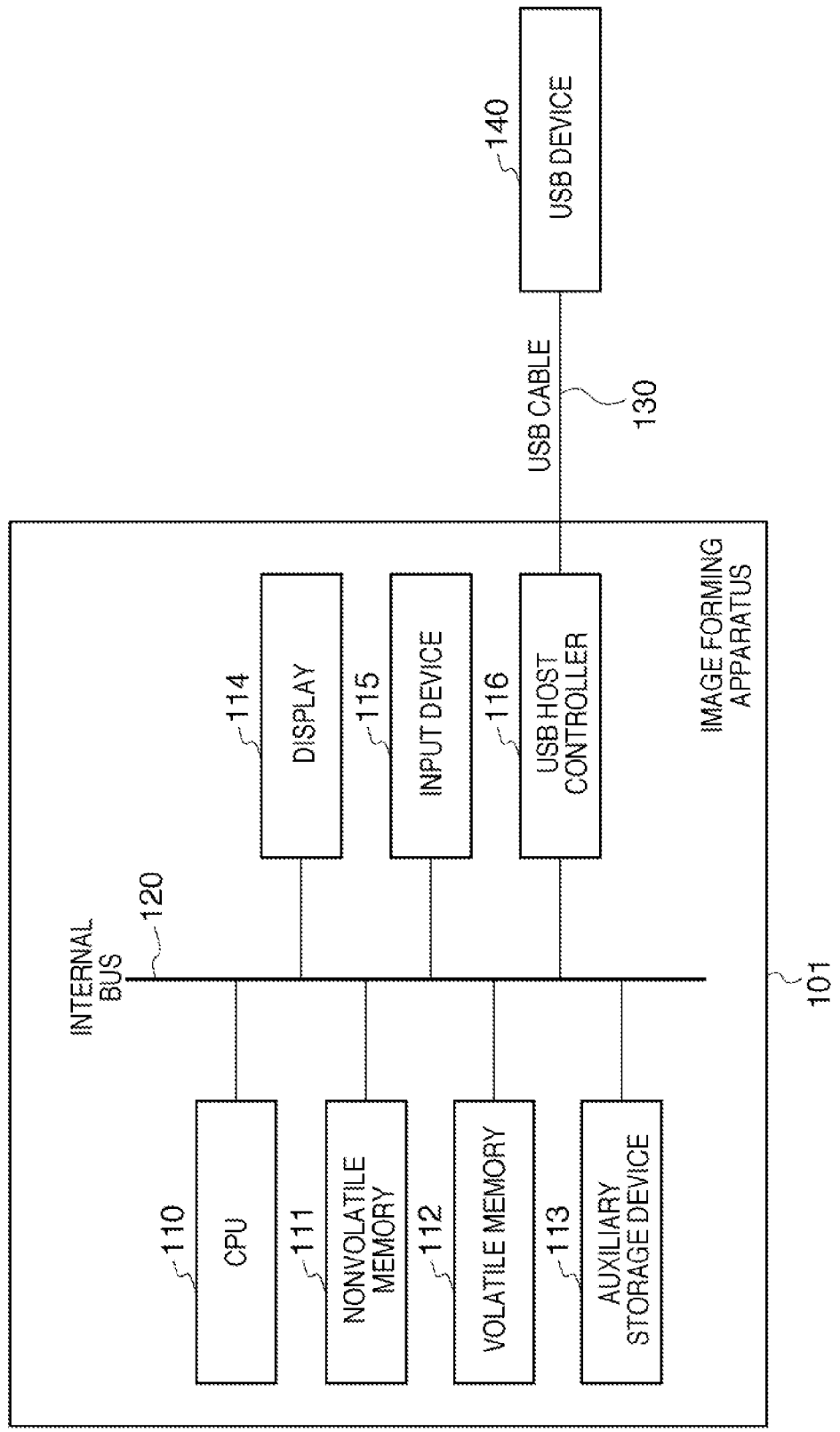
FIG. 1 is a block diagram showing the hardware arrangement to explain the first embodiment of the present invention.

The best mode for carrying out the present invention will be described hereinafter with reference to the drawings. The first embodiment for carrying out the present invention will be described below. FIG. 1 is a block diagram showing an example of the hardware arrangement of an image forming apparatus according to the present invention. FIG. 1 shows an image forming apparatus 101 as an apparatus to which the present invention is applicable. A CPU 110 executes programs and controls various kinds of processing. A nonvolatile memory 111 includes a ROM, which stores programs and data required in an early stage in activation processing of the image forming apparatus 101. A volatile memory 112 includes a RAM which is used as a temporary storage location of programs and data. An auxiliary storage device 113 includes a large-capacity storage device such as a hard disk or RAM drive, which stores large-capacity data and holds program execution codes. Compared to the volatile memory 112, the auxiliary storage device 113 stores data which are required to be held for a longer period of time. In this embodiment, the auxiliary storage device 113 holds software. A display 114 is a device used to inform the user who uses the image forming apparatus 101 of information by displaying the information. Note that the user indicates all users of the image forming apparatus 101. An input device 115 is a device which receives a user's selection instruction, and transfers it to a program via an internal bus 120. A USB host controller 116 is a device which communicates with and controls a USB device 140 via a USB cable 130, as will be described later. The internal bus 120 is a communication bus, which connects the CPU 110, nonvolatile memory 111, volatile memory 112, auxiliary storage device 113, display 114, input device 115, and USB host controller 116 to be able to communicate with each other in the image forming apparatus 101. The USB cable 130 is a cable which physically connects the USB host controller 116 and USB device 140 (to be described later) to be able to communicate with each other. The USB device 140 is an externally connected device which communicates with the image forming apparatus 101 and provides a specific function. For example, the USB device 140 includes a keyboard, mouse, storage device, magnetic card reader, IC card reader, and biometric authentication device. However, the present invention is not limited to these devices, and all devices connected via the USB cable 130 can be used.

Figure 2:
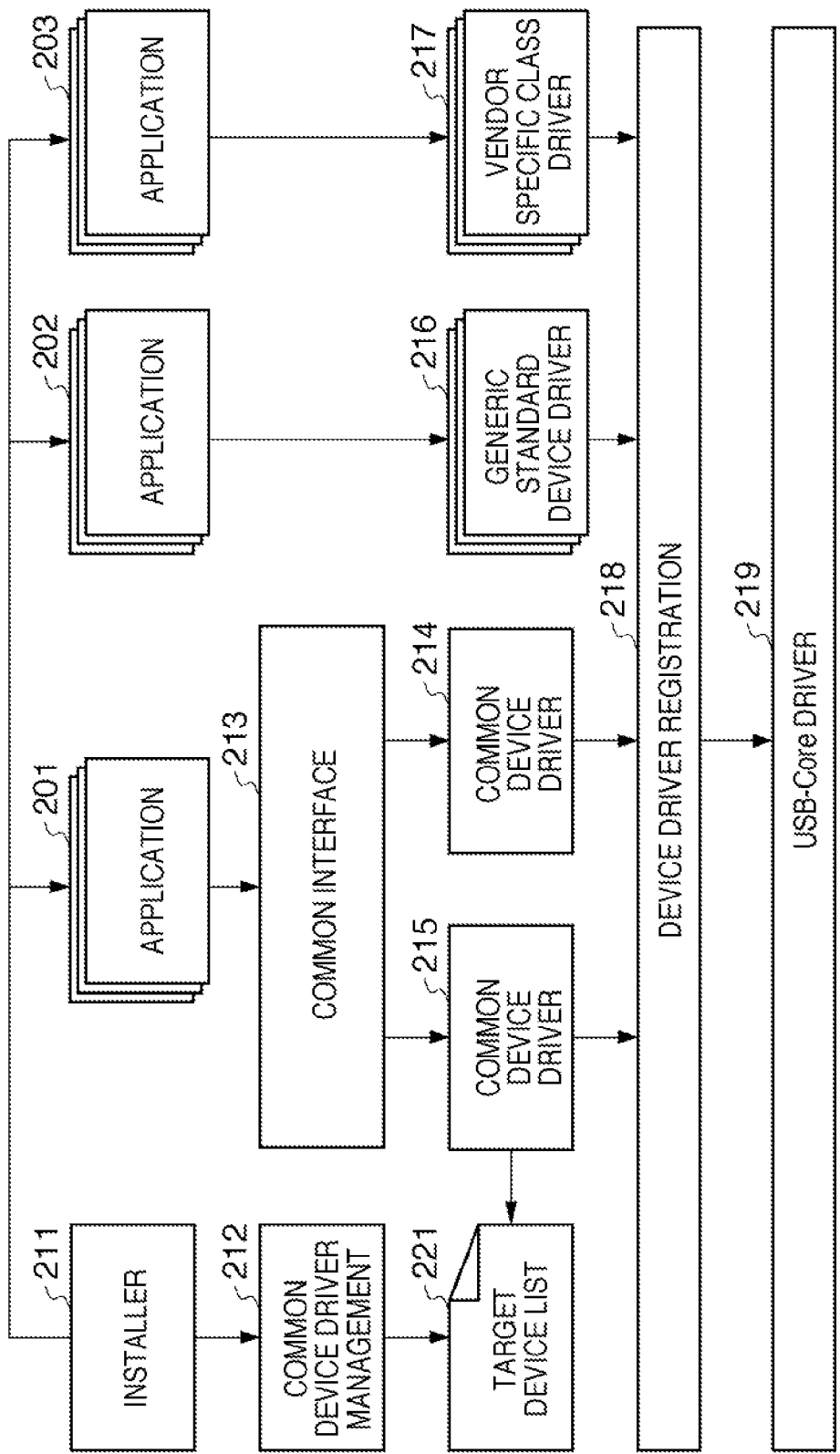
FIG. 2 is a block diagram showing the software configuration to explain the first embodiment of the present invention.

FIG. 2 is a block diagram showing the software configuration so as to explain the embodiment of the present invention. Respective units which appear in FIG. 2 are stored in any of storage units including the nonvolatile memory 111, volatile memory 112, and auxiliary storage device 113, and are executed by the CPU 110. An application 201 is software used to control the USB device 140. The application 201 controls the USB device 140 via a common interface 213 to be described later. An application 202 is software used to control the USB device 140. The application 202 controls the USB device 140 via a generic standard device class driver 216 to be described later. An application 203 is software used to control the USB device 140. The application 203 controls the USB device 140 via a vendor specific class driver 217 to be described later. The aforementioned applications 201, 202, and 203 are separately described as three components since they control the USB device 140 via different routes. Upon explaining common features of the applications 201, 202, and 203, they will be simply described as "application". An installer 211 is unit for installing or uninstalling an application in or from the image forming apparatus 101. Upon installing or uninstalling an application, the installer 211 checks a configuration file indicating features of each application.

Figure 7:
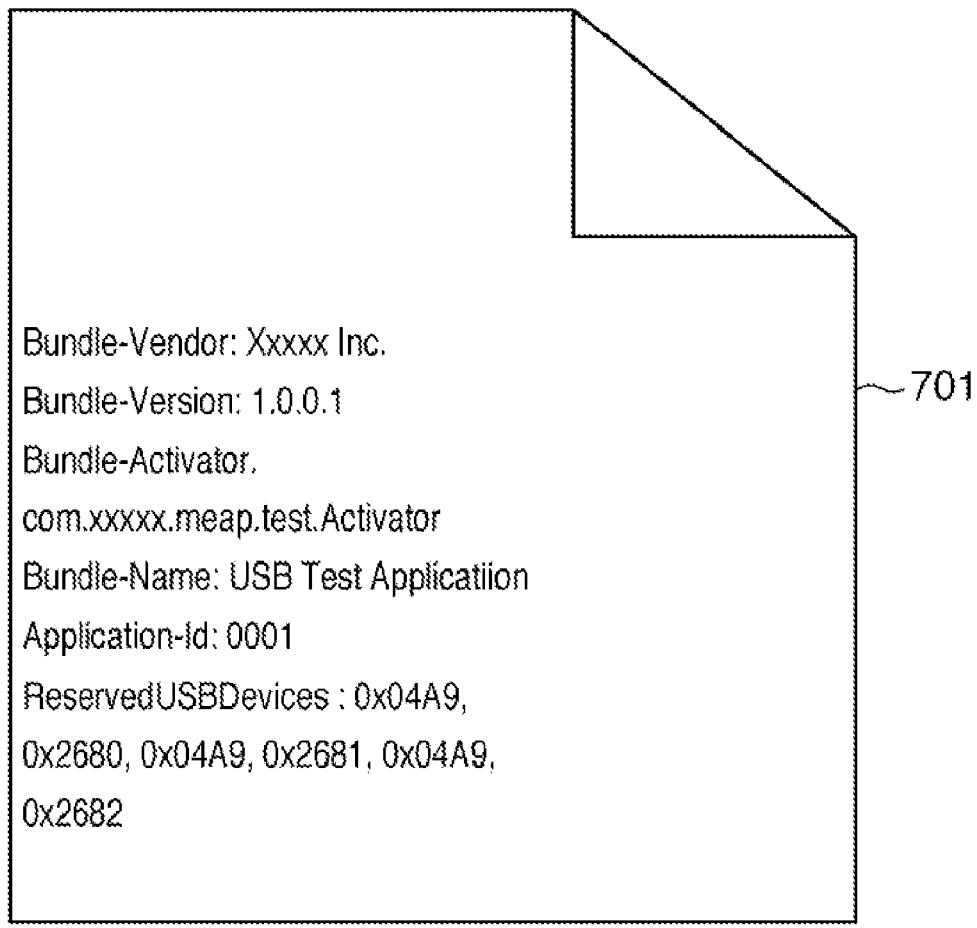
FIG. 7 is a view showing an example of a configuration file of an application, so as to explain the first embodiment of the present invention.

FIG. 7 shows a practical example of the configuration file. A configuration file 701 can describe a plurality of items. In the example shown in FIG. 7, the configuration file 701 describes six items "Bundle-Vendor", "Bundle-Version", "Bundle-Activator", "Bundle-Name", "Application-Id", and "ReservedUSBDevices". "Bundle-Vendor" indicates information of a developer of an application. "Bundle-Version" indicates the version of the application. "Bundle-Activator" indicates an activation class of the application. "Bundle-Name" indicates a name of the application. "Application-Id" indicates an application identifier. Different applications always have different "Application-Id" values. Finally, "ReservedUSBDevices" indicates information used to identify USB devices to be controlled by each application. As information that allows uniquely identifying a USB device, a combination of two identifiers is used. That is, a combination of a 2-byte number indicating the developing vendor of a USB device and that indicating the product identifier of the USB device is used. Note that the 2-byte number indicating the developing vendor of the USB device indicates an "idVendor" field value of a Device Descriptor included in the USB device. Likewise, the 2-byte number indicating the product identifier of the USB device indicates an "idProduct" field value of the Device Descriptor included in the USB device. In the example of FIG. 7, three USB devices are defined by "0x04A9, 0x2680", "0x04A9, 0x2681", and "0x04A9, 0x2682". That is, USB devices (0x2680, 0x2681, 0x2682) developed by a vendor having a vendor identifier "0x04A9" are defined.

The installer 211 reads identifiers which are described in "Application-Id" and "ReservedUSBDevices" in the configuration file, and notifies a common device driver management 212 (to be described later) of these identifiers. Upon installation, the installer 211 requests the common device driver management 212 to add the notified information to a target device list (to be described later). Upon uninstallation, the installer 211 requests the common device driver management 212 to delete the notified information from the target device list. The common device driver management 212 is unit for updating a file of a target device list 221 (to be described later) based on the information notified by the aforementioned installer 211. FIG. 6 shows an example of the target device list 221. The target device list 221 is configured as a file on a file system, and is implemented as a set of records each having a plurality of fields, as shown in FIG. 6. An application ID 601 indicates an identifier used to uniquely identify an application. The application ID 601 corresponds to "Application-Id" described using FIG. 7. A USB device vendor ID 602 indicates an identifier used to uniquely identify a vendor who manufactured the USB device. The USB device vendor ID 602 corresponds to the former 2-byte identifier of "ReservedUSBDevices" described using FIG. 7. A USB device product ID 603 indicates an identifier used to uniquely identify a product of the USB device in the vendor. The USB device product ID 603 corresponds to the latter 2-byte identifier of "ReservedUSBDevices" described using FIG. 7. A device driver identifier 604 indicates an identifier used to uniquely identify a device driver to be loaded, so as to allow the application to control the USB device. A time stamp 605 indicates information that specifies a date and time of registration of the information. The common device driver management 212 checks if the same information has already been registered when it registers the information. That is, whether or not the same information has already been registered is determined by seeing if the information including the same application ID 601, USB device vendor ID 602, USB device product ID 603, and device driver identifier 604 as those of the information to be registered is registered. If the same information has already been registered, the common device driver management 212 ends processing without registering any information. If the same information is not registered, the common device driver management 212 adds the information to the bottom of the target device list. In this embodiment, when two different applications register information with respect to an identical USB device, they independently add information to the target device list 221. This is to prevent one application from being unable to control the USB device when the other application is uninstalled. The common device driver management 212 checks if information to be deleted is already registered when it deletes the information. Whether or not the same information has already been registered is determined by the same method as that upon registration of information. When the designated information has already been registered, the common device driver management 212 deletes the information. When the designated information is not registered, the common device driver management 212 ends processing without any processes.

<Software Configuration>

Figure 8:
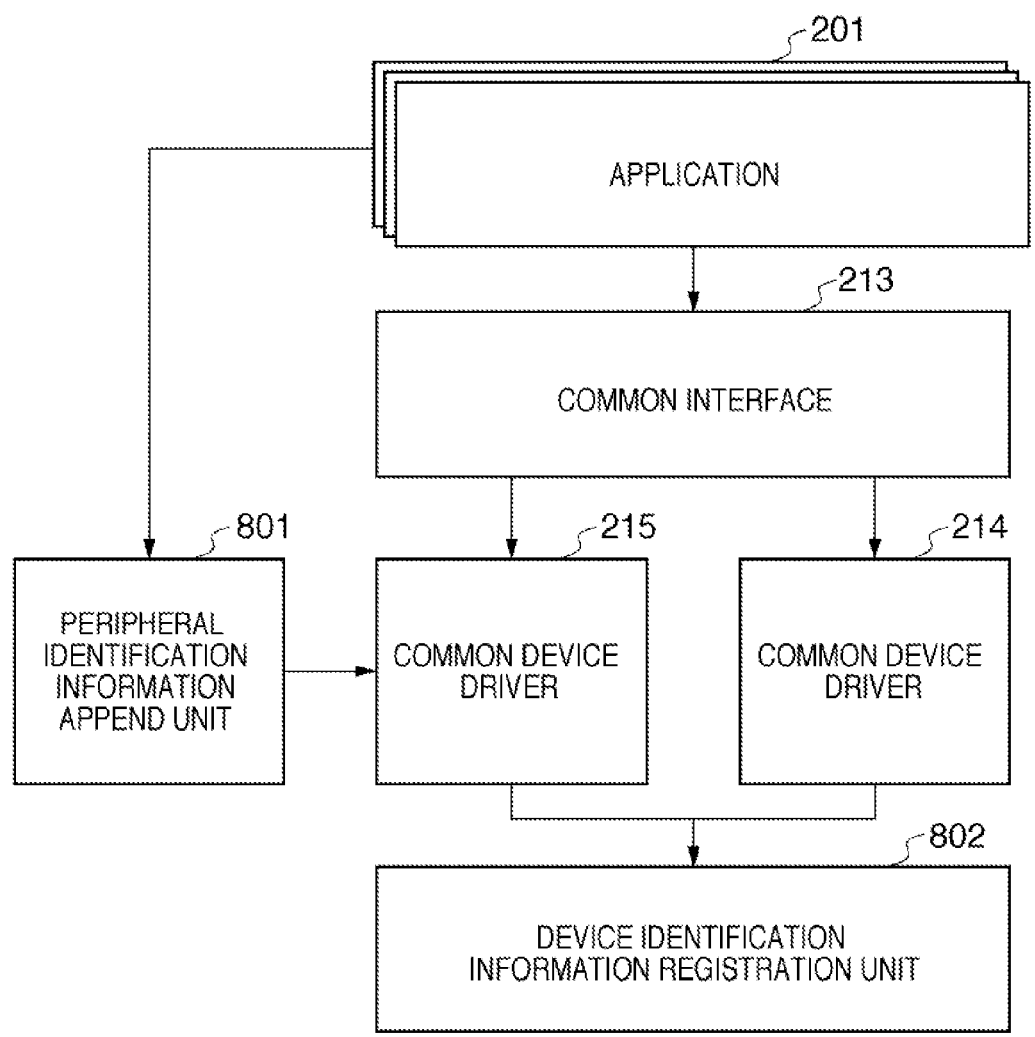
FIG. 8 is a block diagram showing an example of the software configuration so as to explain characteristic features of the present invention.

The aforementioned three components, that is, the installer 211, common device driver management 212, and target device list 221 implement a peripheral identification information append unit 801. FIG. 8 is a block diagram showing the software configuration corresponding to the present invention. The common interface 213 receives a communication request to a USB device from an application, and controls to distribute the request to usable common device drivers 214 and 215 to be described below. The common interface 213 discriminates a device driver which is loaded in correspondence with a USB device as a communication destination indicated by the communication request, and distributes the communication request to that device driver. The common device driver 214 is used to allow the application to control the behavior of the USB device, and is functionally the same as the common device driver 215 to be described later. A device driver registration 218 (to be described later) registers the common device driver 214 in an USB-Core driver (to be described later) as a device driver usable after other drivers. Since the USB-Core driver decides priorities based on the order of registration, the common device driver 214 is recognized to have the lowest priority. The common device driver 214 designates an identifier of a USB device supported by itself using a wildcard "*" when it is registered by the device driver registration 218. In this manner, the common device driver 214 is inevitably loaded for a USB device for which drivers other than the common device driver 214 are not loaded. Then, one of generic standard device class drivers, vendor specific class drivers, and common device drivers is surely provided to a USB device.

The common device driver 215 is used to allow an application to control the behavior of a USB device, and is functionally the same as the common device driver 214. A difference from the common device driver 214 lies in that the common device driver 215 has identification information added to the target device list 221 upon registration in the USB-Core driver. The device driver registration 218 registers the common device driver 215 in the USB-Core driver (to be described later) as a common device driver usable before the generic standard device class driver 216 and after the vendor specific class driver 217 (to be described later). As described above, since the USB-Core driver decides priorities based on the order of registration, the priority of the common device driver 215 is set to be higher than the generic standard device class driver 216 and lower than the vendor specific class driver 217. The common device driver 215 adds an identifier of a USB device supported by itself based on the target device list 221, and is then registered. As described above, the target device list 221 describes identifiers of USB devices defined by the application in "ReservedUSBDevices". For this reason, this configuration allows to load the common device driver 215 even for a general-purpose class USB device. More specifically, the common device driver 215 allows the application to control the behavior of that USB device. That is, the common device driver 215 is a first common device driver which can add identification information, and the common device driver 214 is a second common device driver.

The generic standard device class driver 216 is a device driver which controls the behaviors of a general-purpose class USB device. The general-purpose class has already described above. There is a plurality of types of general-purpose classes, and generic standard device class drivers 216 as many as the number of general-purpose classes supported by the OS are available. The generic standard device class driver 216 is registered in the USB-Core driver before the common device driver 214 and after the common device driver 215 or the vendor specific class driver 217 (to be described later). As described above, since the USB-Core driver decides priorities based on the order of registration, the priority of the generic standard device class driver 216 is set to be higher than the common device driver 214 and lower than the common device driver 215 and the vendor specific class driver 217 (to be described below).

The vendor specific class driver 217 is a dedicated device driver which controls the vendor-specific behaviors of a USB device. One vendor specific class driver 217 can support a plurality of types of USB devices. The vendor specific class driver 217 is registered prior to all other drivers. As described above, since the USB-Core driver decides priorities based on the order of registration, the priority of the vendor specific class driver 217 is set to be higher than all other drivers.

The device driver registration 218 executes processing for registering a plurality of device drivers including the common device driver 214, common device driver 215, generic standard device class driver 216, and vendor specific class driver 217 in an USB-Core driver 219. In this case, the device driver registration 218 controls the order of registration, and manages information about the order of registration in consideration of priorities to be set by the USB-Core driver. A device identification information registration unit 802 according to the present invention includes the device driver registration 218 and USB-Core driver 219. As described above, the device identification information registration unit 802 is configured by internally holding the common device drivers 214 and 215. Also, in this embodiment, the device identification information registration unit 802 internally holds the generic standard device class driver 216 and vendor specific class driver 217 together in addition to the common device drivers 214 and 215.

A format which holds information of each device driver and that associated with its order in association with each other so as to specify the order upon reading out device drivers registered in the USB-Core driver 219 (to be described later) will be referred to as a registration list for the sake of convenience. The device driver registration 218 registers each device driver in the USB-Core driver 219 based on this registration list. However, the holding format about the order upon registration of a driver is not limited to such specific format, and any other formats may be adopted as long as they can control the order of registration in the USB-Core driver 219. Assume that each device driver is registered in the registration list to have its priority. As described above, the USB-Core driver (to be described below) recognizes the order of reading out device drivers based on the order of registration.

The USB-Core driver 219 is a USB subsystem included in the kernel of the Linux OS. The USB-Core driver 219 has roles to provide an API to a device driver by abstracting hardware called a USB controller required to control a USB device, and to manage a list of registered device drivers and USB devices. It should be noted that this list is different from the target device list 221 to be described below and the registration list described above for the sake of convenience.

To summarize the above description, in the USB-Core driver 219, the priorities in descending order of respective drivers are decided as follows:
(1) vendor specific class driver 217
(2) common device driver 215 (with identification information)
(3) generic standard device class driver 216
(4) common device driver 214 (without identification information)

FIG. 9 shows the order of priorities registered in the USB-Core driver 219 for respective types of device drivers in an expedient manner.

Figure 10:
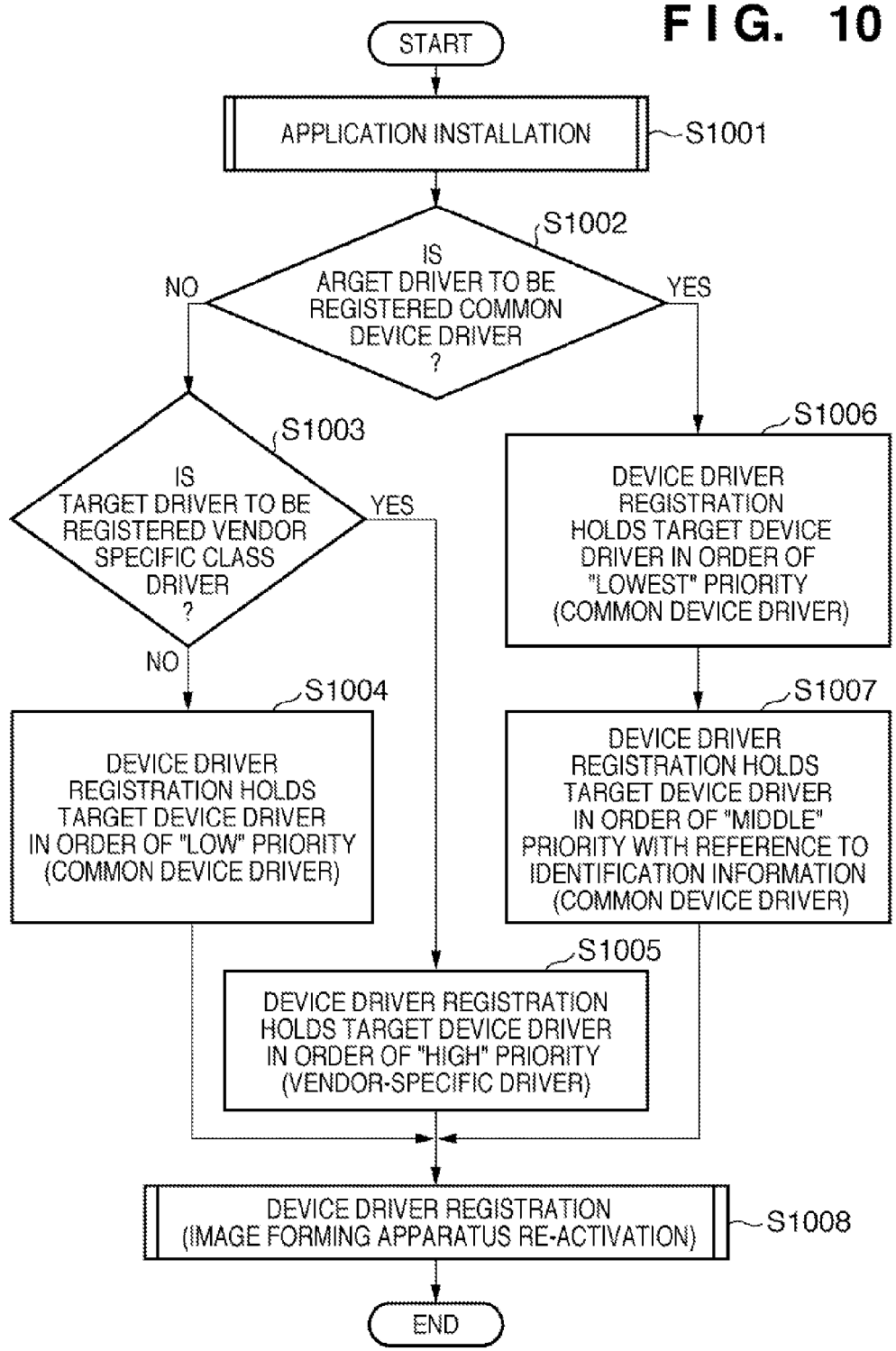
FIG. 10 is a flowchart showing the sequence of processing until a device driver is registered in an image forming apparatus in the present invention for the purpose of convenience.

The target device list 221 is used to manage pieces of identification information of USB devices supported by the common device driver 215. Details of the target device list 221 are as have been described above. FIG. 10 shows a schematic flowchart until respective device drivers which are described so far and are to be registered in the USB-Core driver 219 are registered. The priorities in this case use those shown in FIG. 9 for the sake of simplicity. The sequence of FIG. 10 is implemented when the CPU 110 executes a program stored in, for example, the nonvolatile memory 111. The processing shown in FIG. 10 is mainly executed by the device driver registration 218.

Step S1001 indicates application installation processing (target device list updating processing) to be described later with reference to FIG. 3. In association with the installed application, it is determined whether or not a target driver to be registered is a common device driver (S1002). If the target driver to be registered is a common device driver, the process advances to step S1006; if it is other than a common device driver, the process advances to step S1003. It is determined in step S1003 if the target device driver to be registered is a vendor specific class driver. If the target device driver to be registered is a vendor specific class driver, the process advances to step S1005; otherwise (i.e., a generic standard device class driver), the process advances to step S1004. In step S1004, the device driver registration 218 holds the target driver (i.e., generic standard device class driver) to have a "low" priority order upon registering it in the USB-Core driver 219. In this case, the target driver is added to the registration list. In step S1005, the device driver registration 218 holds the target driver (i.e., vendor specific class driver) to have a "high" priority order upon registering it in the USB-Core driver 219. In this case, the target driver is added to the registration list. In step S1006, the device driver registration 218 holds the target driver (i.e., common device driver) to have a "lowest" priority order upon registering it in the USB-Core driver 219. In this case, the target driver is added to the registration list. Then, the process advances to step S1007. In step S1007, the device driver registration 218 adds identification information to the target driver, and holds the target driver to have a "middle" priority order upon registering it in the USB-Core driver 219. In this case, the target driver is added to the registration list. Note that the identification information can be obtained based on the target device list 221. In fact, either step S1006 or S1007 may be processed earlier. Upon completion of the processing in step S1004, S1005, or S1007 (or S1006), the process advances to step S1008. Step S1008 corresponds to the processing described using FIG. 4. In this way, a device driver managed in the registration list is registered in the USB-Core driver 219 to reflect its registration.

<Application Installation Processing (Device List Updating)>

Figure 3:
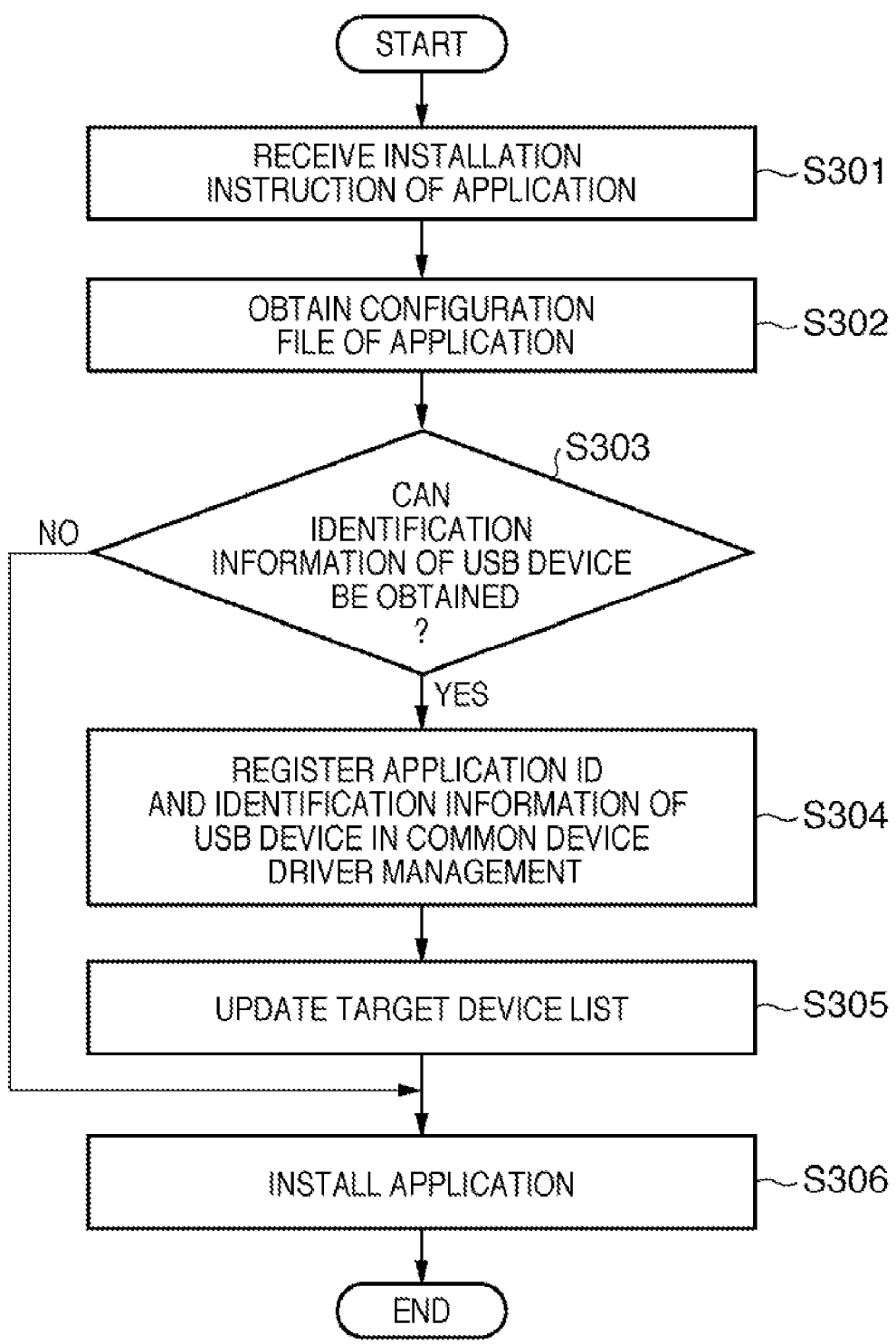
FIG. 3 is a flowchart showing the sequence of processing for registering identification information of a USB device to be controlled by an application at the time of installation of the application, so as to explain the first embodiment of the present invention.

FIG. 3 is a flowchart for explaining the embodiment of the present invention. FIG. 3 shows the sequence of processing for registering identification information of a USB device to be controlled by an application in the target device list at the time of installation of the application. Respective processes of the present invention are stored in any of storage units including the nonvolatile memory 111, volatile memory 112, and auxiliary storage device 113, and are executed by the CPU 110.

In step S301, the installer 211 receives an installation instruction of an application. Unit for giving the instruction to install an application is not particularly limited. For example, a method of installing an application pre-stored in the auxiliary storage device 113 in response to a user's instruction using the display 114 and input device 115 may be used. In step S302, the installer 211 obtains a configuration file of the application. The installer 211 checks in step S303 if the configuration file includes identification information of a USB device. Whether or not the configuration file includes identification information is determined by seeing if the configuration file includes the definition of "ReservedUSBDevices" and further includes the configuration of a USB device to be usable in addition to the current configuration. The usable configuration or not is as has been described above using FIG. 6. If the configuration file includes identification information of a USB device, the installer 211 executes the process in step S304. If the configuration file does not include any identification information of a USB device, the process jumps to step S306. In step S304, the installer 211 registers an application ID and identification information of a USB device defined in the configuration file obtained in step S302 in the common device driver management 212. As the application ID, a character string described in "Application-Id" is used. As the identification information of a USB device, a combination of two identifiers defined by 2-byte numbers in "ReservedUSBDevices" is used. In step S305, the common device driver management 212 additionally registers the application ID and identification information of a USB device registered in step S304 in the target device list 221. In step S306, the installer 211 executes processing for installing the application. With the aforementioned sequence, the processing for registering identification information of a USB device to be controlled by an application at the time of installation of the application is executed.

<Device Driver Registration Processing (Upon Activation of Image Forming Apparatus)>

Figure 4:
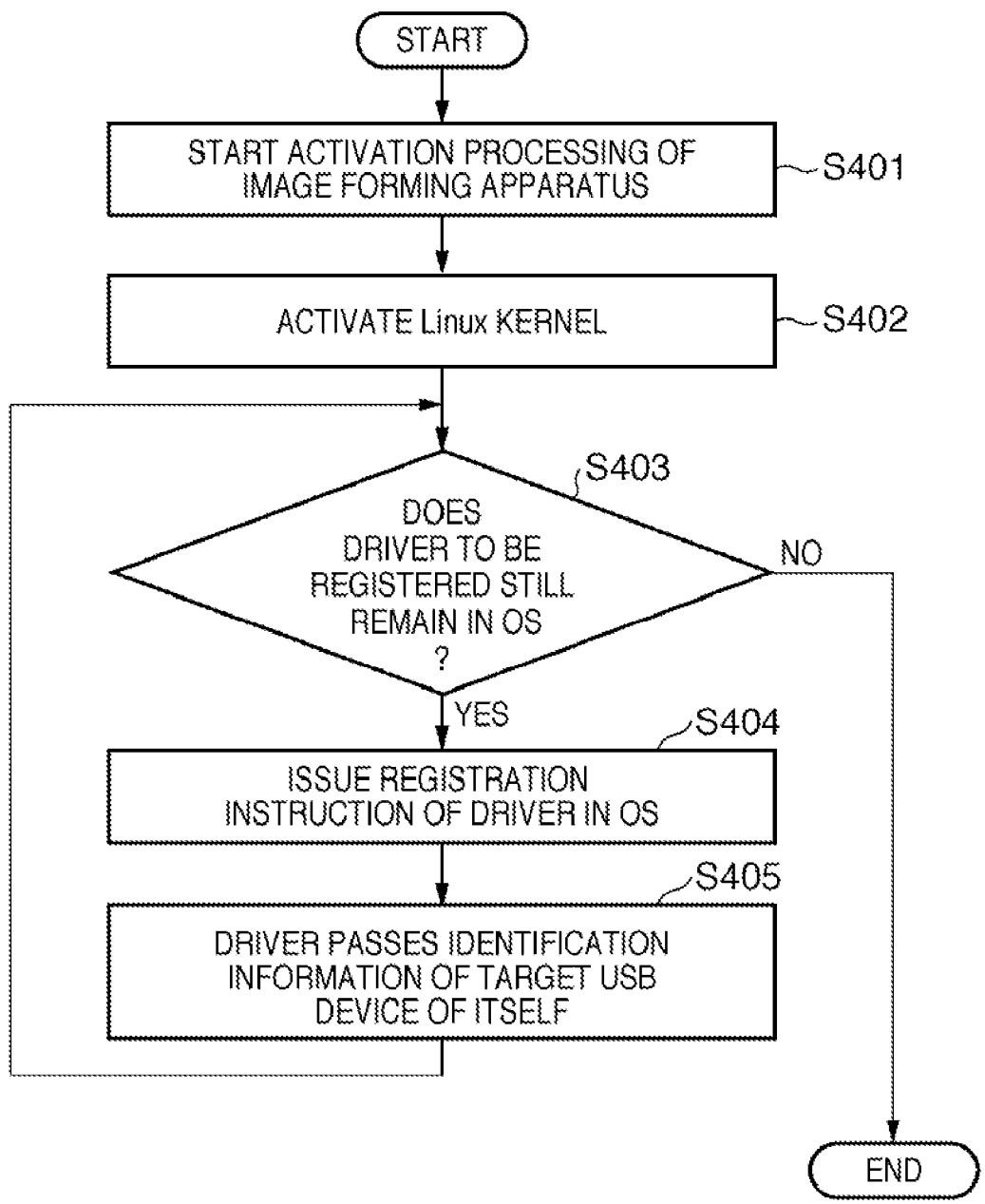
FIG. 4 is a flowchart showing the sequence of device driver registration processing upon activating an image forming apparatus, so as to explain the first embodiment of the present invention.

FIG. 4 is a flowchart for explaining the embodiment of the present invention. FIG. 4 shows the sequence of registration processing of a device driver upon activating the image forming apparatus 101. As has been described above in the description of FIG. 3, respective processes of the present invention are stored in any of storage units including the nonvolatile memory 111, volatile memory 112, and auxiliary storage device 113, and are executed by the CPU 110.

In step S401, activation processing of the image forming apparatus 101 is started. In step S402, a kernel image of the Linux OS is loaded and executes activation processing. In step S403, in order to execute registration processing in turn for device drivers held in the image forming apparatus 101, the device driver registration 218 executes processing for extracting device drivers one by one from the registration list as a processing target. As has already been described above, since the USB-Core driver 219 decides priorities based on the order of registration, the extraction processing in this step is processed in the order described using FIG. 9. If all drivers have already been processed, the registration processing of device drivers described using this flowchart ends. If device drivers to be registered still remain, the process advances to step S404. In step S404, a device driver extracted in step S403 is registered in the USB-Core driver 219. In this case, a device driver is registered using, for example, a "modprobe" command in the Linux OS. In step S405, the device driver registered in the Linux OS in step S404 registers identification information of a USB device supported by itself in the USB-Core driver 219. In this case, identification information is registered using, for example, an usb register function provided by the Linux OS. Details of such function depend on, for example, the format of the Linux OS which provides that function, and are not particularly limited. Hence, a description of this function will not be given. Upon completion of the process in step S405, the process returns to step S403 to repeat the processing. With the aforementioned sequence, the registration processing of device drivers upon activating the image forming apparatus is executed.

<Application Uninstallation Processing (Device List Updating)>

Figure 5:
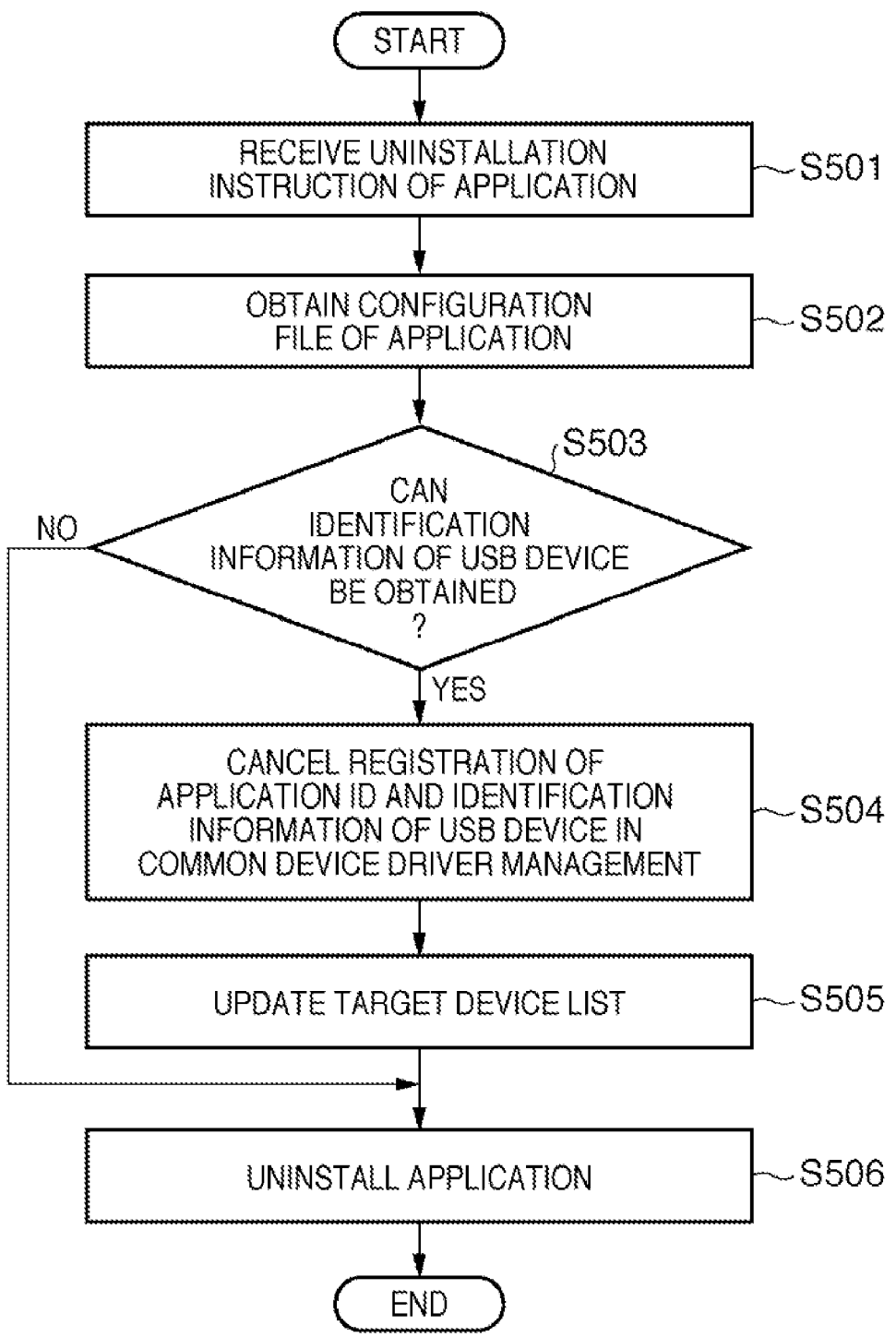
FIG. 5 is a flowchart showing the sequence of processing for canceling registration of identification information of a USB device to be controlled by an application at the time of uninstallation of the application, so as to explain the first embodiment of the present invention.

FIG. 5 is a flowchart for explaining the embodiment of the present invention. FIG. 5 shows the sequence of processing for uninstalling an application. As has been described above in the description of FIG. 3, respective processes of the present invention are stored in any of storage units including the nonvolatile memory 111, volatile memory 112, and auxiliary storage device 113, and are executed by the CPU 110.

In step S501, the installer 211 receives an uninstallation instruction of an application. Unit for giving the instruction to uninstall an application is not particularly limited. For example, a method in which the user gives the instruction to uninstall an application using the display 114 and input device 115 may be used. In step S502, the installer 211 obtains a configuration file of the application. The application to be uninstalled is stored in the auxiliary storage device 113. The installer 211 checks in step S503 if the configuration file obtained in step S502 includes identification information of a USB device. Whether or not the configuration file includes identification information is determined by seeing if the configuration file includes the definition of "ReservedUSBDevices" and the further usable configuration is implemented in addition to the current configuration. The usable configuration is as has been described above. If the configuration file includes identification information of a USB device, the process advances to step S504. If the configuration file does not include any identification information, the process advances to step S506. In step S504, the installer 211 cancels registration of an application ID and identification information of a USB device described in the configuration file obtained in step S502 from the common device driver management 212. As the application ID, a character string described in "Application-Id" is used. As the identification information of a USB device, a combination of two identifiers defined by 2-byte numbers in "ReservedUSBDevices" is used. In step S505, the common device driver management 212 cancels registration of the registered application ID and identification information of a USB device from the target device list 221 in step S504, and updates the target device list 221. At the time of registration cancellation, all these pieces of information are deleted only when they match. If no matching information is registered, the update processing is skipped. In step S506, the installer 211 executes processing for uninstalling the application. With the aforementioned sequence, the processing for canceling registration of identification information of a USB device to be controlled by an application at the time of uninstallation of the application is executed. The first embodiment for practicing the present invention has been described. According to this embodiment, an application which controls a USB device via a common device driver is allowed to control a desired USB device. At the same time, when a device driver required by a specific USB device is not included in the OS, a common device driver is loaded in a conventional manner, and can be controlled from an application.

<Other Configuration Examples>

The respective units described in the first embodiment for practicing the present invention can also be implemented by other configurations. As other configuration examples, other configurations based on the respective units described in the first embodiment will be described below.

The USB host controller 116 in the first embodiment may be replaced by a hardware component used to connect other peripherals. For example, the USB host controller 116 may be replaced by a SCSI host controller. In this case, the USB cable 130 is replaced by a SCSI cable, and the USB device 140 is similarly replaced by a peripheral corresponding to SCSI connection. An externally connected device is an example of a peripheral. The externally connected device is a peripheral when the image forming apparatus is considered as, for example, a USB host. The peripheral may often be externally connected to the image forming apparatus via a communication interface such as USB. Also, the peripheral may be connected via the USB host controller 116 or the like of the image forming apparatus, and may be incorporated inside the housing of the image forming apparatus.

The configuration file held by the application 201 in the first embodiment need not have a format of a file. For example, the application 201 may have a function of a function call that can be called from the installer 211, and information to be held in the configuration file may be exchanged via the function call.

The peripheral identification information append unit 801 configured by the installer 211, common device driver management 212, and target device list 221 in the first embodiment may have another configuration. For example, the peripheral identification information append unit 801 may have a configuration which does not include the installer 211, and in which the application 201 calls the common device driver management 212. Furthermore, the peripheral identification information append unit 801 may have a configuration which does not include the common device driver management 212, and in which the application 201 writes identification information of a USB device in the target device list 221.

As still another example, the target device list 221 may be a structure temporarily held in a shared memory on the nonvolatile memory 111 in place of a file. In this case, the application 201 accesses the shared memory to update the information of the target device list 221. Alternatively, the target device list 221 may be a structure held on a memory managed by the common device driver 215. In this case, the application 201 calls the common device driver 215 to update the information of the target device list 221.

The installer 211 in the first embodiment notifies the common device driver management 212 of required information at the timings of installation and uninstallation of the application 201. However, these timings need not be those of installation and uninstallation. For example, the installer 211 may notify the common device driver management 212 of required information at the operation start timing and operation stop timing of the application 201.

Determination as to whether or not to update the target device list 221 in the common device driver management 212 in the first embodiment may include finer checking processes. For example, when the USB device vendor ID 602 and USB device product ID 603 match, and the device driver identifier 604 does not match, it may be determined that some abnormality has occurred, and an error may be returned.

The common interface 213 in the first embodiment may permit only an application, which registers identification information of a USB device in the target device list 221, to make communications. In this case, the common interface 213 reads the values defined in "ReservedUSBDevices" from the configuration file 701 of the application 201, and compares them with a USB device as a communication request destination to determine whether or not to permit communications. As another implementation method, the common interface 213 may refer to the target device list 221. In this case, whether or not to permit communications is determined based on the checking result of a combination of the application ID 601, USB device vendor ID 602, and USB device product ID 603.

The target device list 221 in the first embodiment may hold other kinds of information. For example, the target device list 221 may hold a release number of a USB device, and may switch a device driver to have an arbitrary release number as a boundary. Alternatively, the target device list 221 may hold a class code, subclass code, and protocol code of a USB device, and may switch a device driver based on these pieces of information. Note that the release number of a USB device indicates the value of a "bcdDevice" field of the Device Descriptor included in the USB device. Also, the class code of a USB device indicates the value of a "bDeviceClass" field of the Device Descriptor included in the USB device. Furthermore, the subclass code of a USB device indicates the value of a "bDeviceSubclass" field of the Device Descriptor included in the USB device. Moreover, the protocol code of a USB device indicates the value of a "bDeviceProtocol" field of the Device Descriptor included in the USB device. Alternatively, the target device list 221 may hold the values of "bDeviceClass", "bDeviceSubclass", and "bDeviceProtocol" fields of an Interface Descriptor.

Another embodiment for practicing the present invention has been explained. According to this embodiment, an application which controls a USB device via a common device driver is allowed to control a desired USB device as in the first embodiment. At the same time, when a device driver required by a specific USB device is not included in the OS, a common device driver is loaded in a conventional manner, and can be controlled from an application.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-006119, filed Jan. 14, 2009, which is hereby incorporated by reference herein in its entirety.

What is claimed is:

1. An apparatus comprising:
an operating system which manages information of a registered device driver and loads the registered device driver,
a generic standard device class driver which controls an operation of a peripheral,
a first common device driver which does not have logic for controlling the operation of the peripheral and which is used by an application that has a logic for controlling the operation of the peripheral when the application controls the peripheral, and
a device identification information registration unit configured to register information of a device driver in the operating system in order to load, when the peripheral is connected to the apparatus, the first common device driver which is used for controlling the peripheral in preference to the generic standard device class driver for controlling the peripheral, or a vendor specific class driver in preference to the first common device driver.

2. The apparatus according to claim 1,
wherein the device identification information registration unit registers a second common device driver to the operating system as a usable device driver by the application independent of the first common device driver, and
wherein the operating system loads the second common device driver, in a case that neither the first common device driver nor the generic standard device class driver for controlling the peripheral has been registered in the operating system when the peripheral is connected.

3. The apparatus according to claim 2, wherein said device identification information registration unit manages an order of registration based on types of device drivers upon registration of the first common device driver, the second common device driver, the generic standard device class driver, and the vendor specific class driver in the interface, and registers the first common device driver, the second common device driver, the generic standard device class driver, and the vendor specific class driver in the interface according to the order.

4. The apparatus according to claim 3, wherein said device identification information registration unit registers the vendor specific class driver, the first common device driver, the generic standard device class driver, and the second common device driver in the interface, so that priorities are set in an order of the vendor specific class driver, the first common device driver, the generic standard device class driver, and the second common device driver, which are to be used from the application in that order.

5. The apparatus according to claim 2, further comprising a selection unit which selects, when the application uses the peripheral, one of the first common device driver and the second common device driver based on registration of device drivers.

6. The apparatus according to claim 1, wherein a peripheral identification information append unit issues a registration notification and a cancel notification associated with the identification information upon installing and uninstalling the application.

7. The apparatus according to claim 1, wherein the peripheral is a USB device.

8. The apparatus according to claim 1, wherein when a peripheral is connected, the operating system loads a device driver corresponding to the peripheral by priority.

9. A method of controlling an apparatus which includes an operating system which manages information of a registered device driver and loads the registered device driver, a generic standard device class driver which controls an operation of a peripheral, and a first common device driver which does not have logic for controlling the operation of the peripheral and which is used by an application that has a logic for controlling the operation of the peripheral when the application controls the peripheral, the method comprising:
a device identification information registration step of registering information of a device driver in the operating system in order to load, when the peripheral is connected to the apparatus, the first common device driver which is used for controlling the peripheral in preference to the generic standard device class driver for controlling the peripheral, or a vendor specific class driver in preference to the first common device driver.

10. A non-transitory computer-readable storage medium retrievably storing a program for controlling a computer which includes an operating system which manages information of a registered device driver and loads the registered device driver, a generic standard device class driver which controls an operation of a peripheral, and a first common device driver which does not have logic for controlling the operation of the peripheral and which is used by an application that has a logic for controlling the operation of the peripheral when the application controls the peripheral, the program controlling the computer to function as a apparatus and to perform the following steps:
a device identification information registration step of registering information of a device driver in the operating system in order to load, when the peripheral is connected to the apparatus, the first common device driver which is used for controlling the peripheral in preference to the generic standard device class driver for controlling the peripheral, or a vendor specific class driver in preference to the first common device driver.

* * * * *